United States Patent
Kopiec et al.

(10) Patent No.: US 9,950,614 B2
(45) Date of Patent: Apr. 24, 2018

(54) VENTING APPARATUS FOR LIQUID CONTAINERS, IN PARTICULAR FOR LIQUID CONTAINERS FOR AN AQUEOUS UREA SOLUTION

(71) Applicant: Kautex Textron GmbH & Co. KG, Bonn (DE)

(72) Inventors: Christian Kopiec, St. Augustin (DE); Stefan Lenz, Bergisch Gladbach (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 0 days.

(21) Appl. No.: 14/763,426

(22) PCT Filed: Mar. 14, 2013

(86) PCT No.: PCT/EP2013/000755
§ 371 (c)(1),
(2) Date: Jul. 24, 2015

(87) PCT Pub. No.: WO2014/114305
PCT Pub. Date: Jul. 31, 2014

(65) Prior Publication Data
US 2015/0367724 A1 Dec. 24, 2015

(30) Foreign Application Priority Data
Jan. 24, 2013 (DE) .......... 10 2013 001 150

(51) Int. Cl.
*B60K 15/035* (2006.01)
*B29C 45/00* (2006.01)
(Continued)

(52) U.S. Cl.
CPC ........ *B60K 15/035* (2013.01); *B29C 45/0025* (2013.01); *B29C 45/0055* (2013.01);
(Continued)

(58) Field of Classification Search
CPC ........... B29C 2945/76531; B29C 2945/76732; B29C 45/0025; B29C 45/0055;
(Continued)

(56) References Cited

U.S. PATENT DOCUMENTS 8,881,931 B2 * 11/2014 Chiu .................... H05K 5/0213
215/264
2006/0096258 A1 5/2006 Gouzou et al.
(Continued)

FOREIGN PATENT DOCUMENTS

DE 102005059578 A1 6/2007
GB 2462176 A 3/2010

OTHER PUBLICATIONS

PCT International Search Report dated Oct. 22, 2013, received in corresponding PCT Application No. PCT/EP13/00755, 2 pgs.
(Continued)

*Primary Examiner* — James N Smalley
*Assistant Examiner* — Madison L Poos
(74) *Attorney, Agent, or Firm* — Grossman, Tucker, Perreault & Pfleger, PLLC

(57) ABSTRACT

The present invention discloses a venting apparatus (10) for liquid containers, in particular for an aqueous urea solution, and comprises a housing (11) that is connectable to the liquid container (40) and that has a first opening (12) to the liquid container (40) and a second opening (13) to the surrounding environment of the liquid container. The venting apparatus further comprises an air-permeable and liquid-impermeable membrane, which is arranged between the first opening (12) and the second opening (13) in the housing (11). In addition, the venting apparatus comprises a slosh baffle, which at least partly covers the first opening (12). The venting apparatus (10) according to the invention is characterized in that the housing (11) and the slosh baffle (20) are formed in one piece.

8 Claims, 9 Drawing Sheets

Figure 1A:
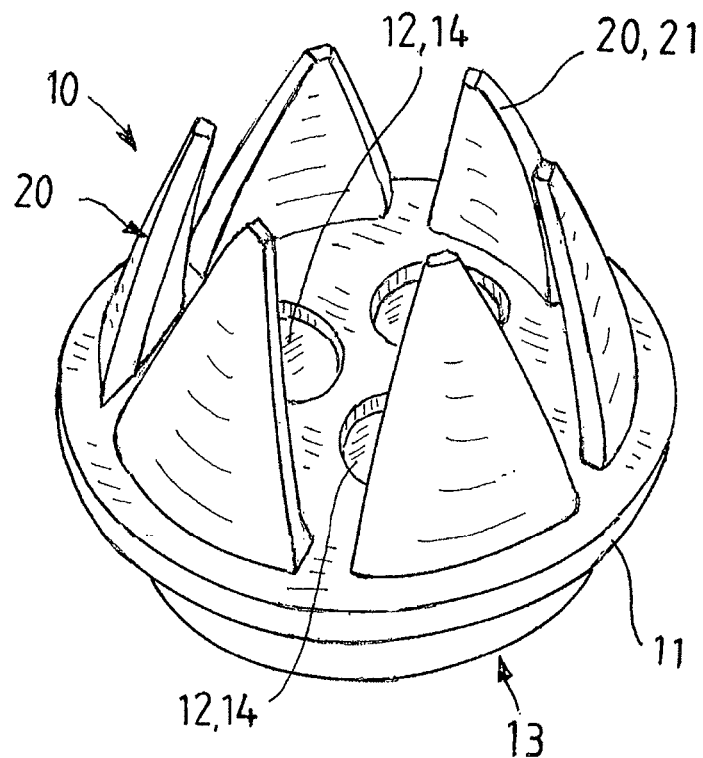

(51) Int. Cl.
*B29C 45/78* (2006.01)
*B60K 15/03* (2006.01)
*B60K 13/04* (2006.01)
*B29K 101/12* (2006.01)
*B29L 31/56* (2006.01)

(52) U.S. Cl.
CPC ........ *B29C 45/78* (2013.01); *B60K 15/03504* (2013.01); *B29C 2945/76531* (2013.01); *B29C 2945/76732* (2013.01); *B29K 2101/12* (2013.01); *B29L 2031/565* (2013.01); *B60K 13/04* (2013.01); *B60K 2015/03032* (2013.01); *B60K 2015/0344* (2013.01); *B60K 2015/03276* (2013.01); *B60K 2015/03309* (2013.01); *B60K 2015/03509* (2013.01); *B60K 2015/03542* (2013.01); *B60K 2015/03557* (2013.01)

(58) Field of Classification Search
CPC ............... B29C 45/78; B29K 2101/12; B29L 2031/565; B60K 13/04; B60K 15/035; B60K 15/03504; B60K 2015/03032; B60K 2015/03276; B60K 2015/03309; B60K 2015/0344; B60K 2015/03509; B60K 2015/03542; B60K 2015/03557; B65D 51/16; B65D 51/1605; B65D 51/1611; B65D 51/1622; B65D 2205/00; B65D 2205/02
USPC ......... 220/203.16, 203.17, 203.29, 213, 229, 220/360, 361, 746; 215/261
See application file for complete search history.

(56) References Cited

U.S. PATENT DOCUMENTS

2010/0236640 A1 9/2010 Erdmann
2011/0168715 A1 7/2011 Erdmann et al.

OTHER PUBLICATIONS

PCT Written Opinion dated Oct. 22, 2013, received in corresponding PCT Application No. PCT/EP13/00755, 7 pgs.

* cited by examiner

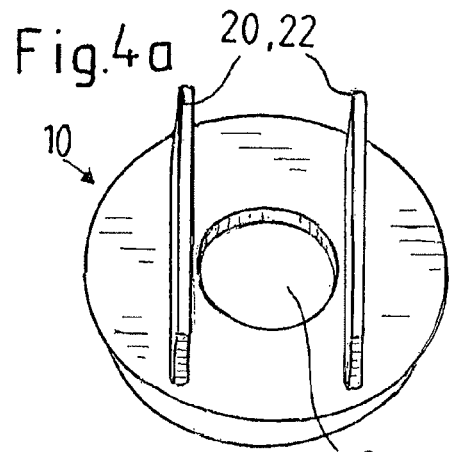
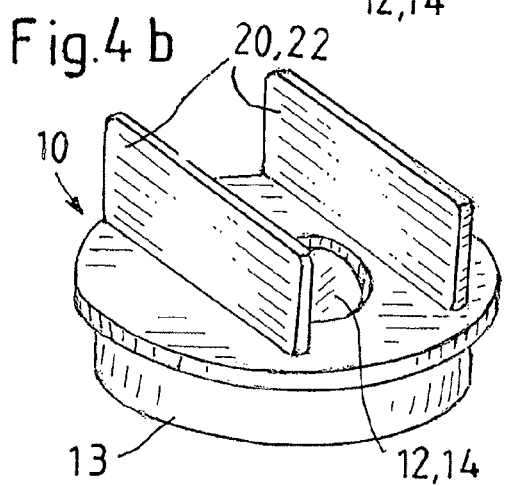
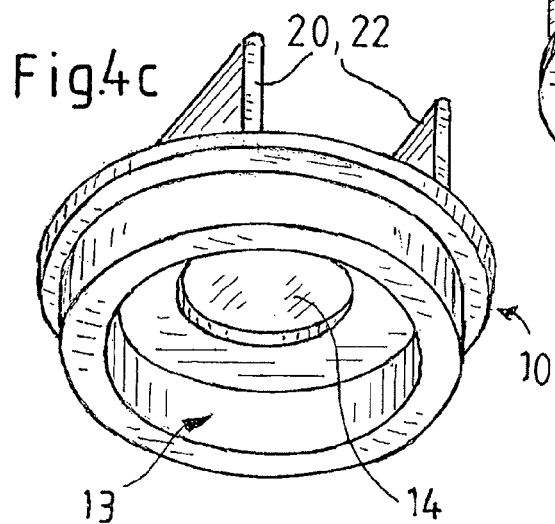
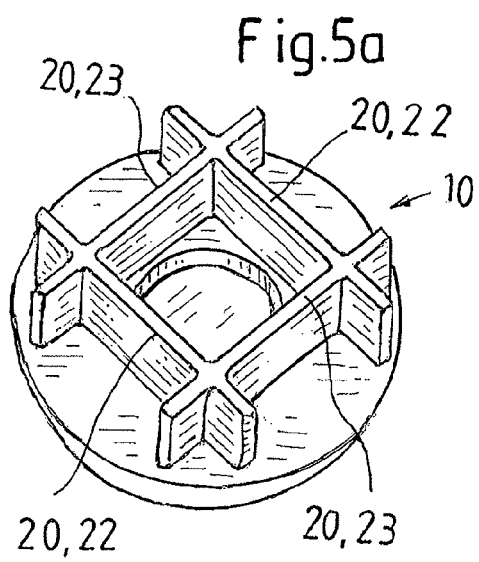
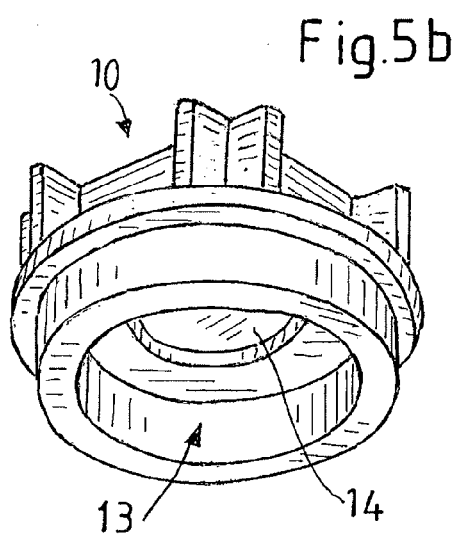

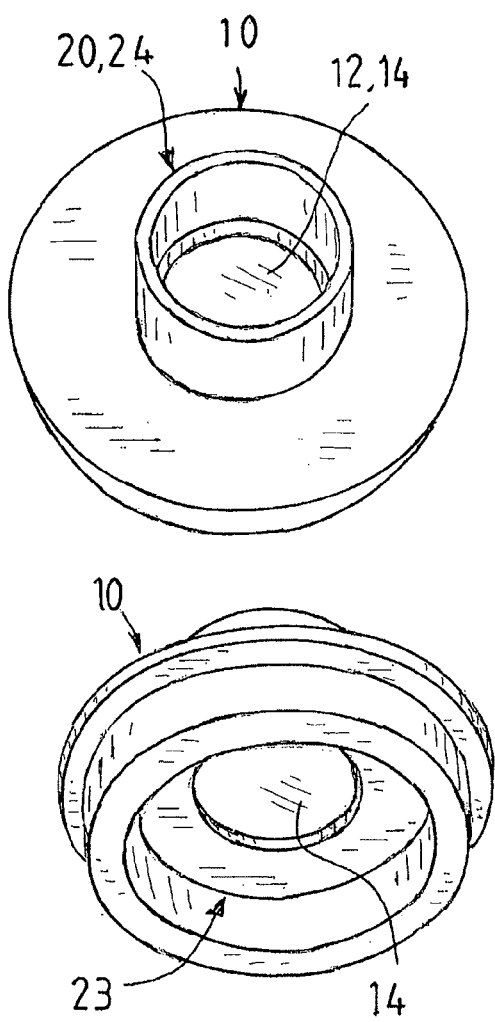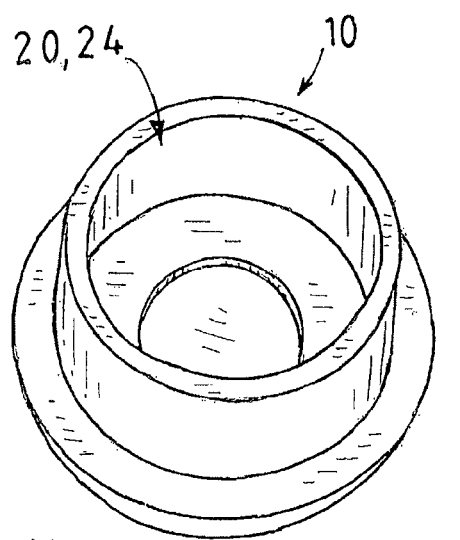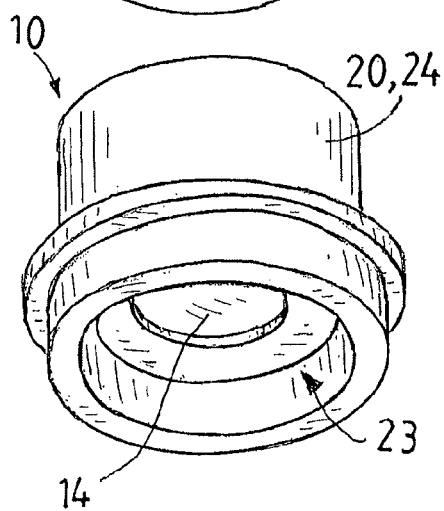

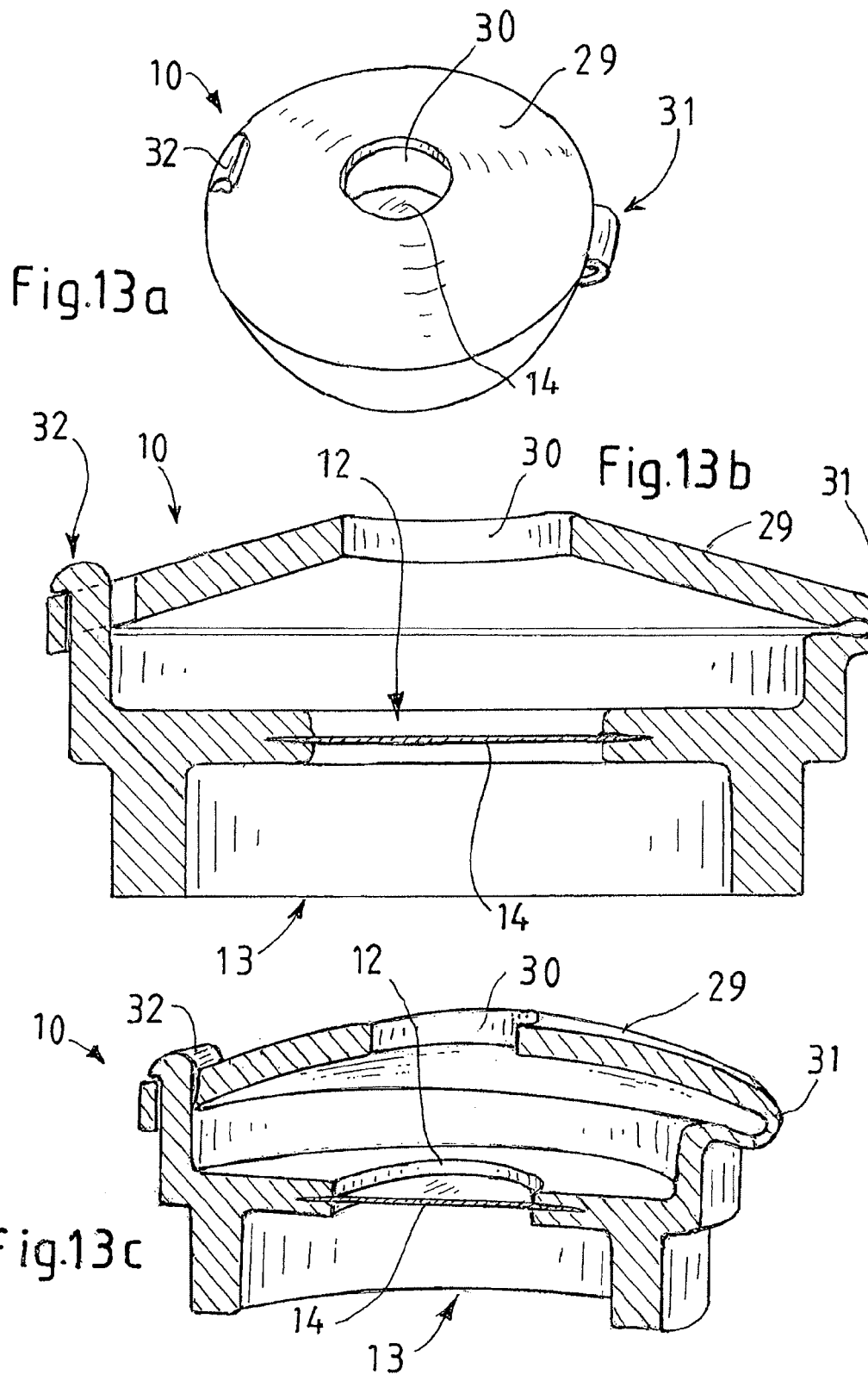

VENTING APPARATUS FOR LIQUID CONTAINERS, IN PARTICULAR FOR LIQUID CONTAINERS FOR AN AQUEOUS UREA SOLUTION

The invention relates to a venting apparatus for liquid containers, in particular for liquid containers for an aqueous urea solution.

In automotive engineering, the SCR (selective catalytic reduction) method is increasingly used in order to reduce the nitrogen oxide emissions of vehicles. The ammonia required for the SCR reaction is not used directly, but in the form of a 32.5% aqueous urea solution in accordance with DIN 70070. The aqueous urea solution is injected from the SCR catalytic converter into the exhaust gas tract, for example by means of a metering pump or an injector. Ammonia and $CO_2$ are produced from the urea/water solution by means of a hydrolysis reaction. The ammonia thus produced can react with the nitrogen oxides in the exhaust gas and thus reduce the nitrogen oxide emissions. The amount of injected urea is dependent on the nitrogen oxide emission of the engine and therefore on the momentary speed and the torque of the engine. Here, the efficacy of the SCR catalytic converter is dependent on whether the aqueous urea solution is injected in the correct ratio to the nitrogen oxide emission of the engine. With excessively low injection of aqueous urea solution, the efficacy of the nitrogen oxide reduction falls. If too much urea is injected, the ammonia formed therefrom may not react with nitrogen oxides and may reach the surrounding environment. A conveyance of aqueous urea solution that is as accurate as possible from the liquid container for the aqueous urea solution to the SCR catalytic converter is thus necessary, preferably in the milliliter range.

Within a liquid container, an overpressure or negative pressure may be present, for example caused by a change to the ambient temperature or a change to the air pressure outside the liquid container. In order to counterbalance the overpressure or negative pressure within the liquid container and to thus prevent damage to the liquid container, venting apparatuses are known from the prior art.

A venting apparatus is normally arranged between the liquid container and the surrounding environment thereof outside the liquid container in order to eliminate an overpressure or negative pressure within the liquid container. The venting apparatuses known from the prior art comprise a venting valve on the upper wall of the liquid container.

A ventilation apparatus for tanks is known from DE 10 2005 052 586 A1, which makes it possible to control the gas exchange between the tank and the outer environment thereof, wherein the ventilation apparatus comprises a ventilation element, which makes it possible to limit the overpressure or negative pressure within the tank. The disclosed ventilation apparatus has a further apparatus between the tank and the ventilation element, said further apparatus being designed in such a way that gases can escape from the tank and the liquid contained in the tank is retained.

With use of a venting apparatus in a vehicle, there may be the problem that, at temperatures below −11° C., the urea solution located in the liquid container may be present, at least in part, as ice or as a liquid/ice mixture. By moving the vehicle, this liquid/ice mixture sloshes against an air-permeable and liquid-impermeable membrane provided in the venting apparatus, such that said membrane may be damaged by the abrasive sloshing of the liquid/ice mixture. It is known from the prior art to provide what is known as a slosh baffle in order to protect the membrane against abrasive sloshing of such a liquid/ice mixture. When venting blow molded SCR containers, it is known that the slosh baffle measure is formed by a "needle bore" produced in the blow molding process. Here, the side of the membrane facing the liquid is screened or covered for waves of sloshed mixture apart from the diameter of the needle bore. The housing for the ventilation membrane, inclusive of the membrane itself, is then welded on conjointly. A cavity is thus produced beneath the membrane with a connection opening (needle bore) to the interior of the SCR container. The three elements necessary for the ventilation process are the blow-molded part with its needle bore, the membrane support inclusive of the membrane, and the membrane housing. These three elements are each provided separately and have to be produced in respective separate production steps.

The object of the present invention is to provide a venting apparatus, which can be produced more easily, of which the production costs are reduced and of which the functionality is still maintained however. This object is achieved by a venting apparatus having the features according to claim 1 and also by a liquid container having the features of claim 13. Advantageous embodiments are described in the dependent claims.

The venting apparatus according to the invention for liquid containers, in particular for an aqueous urea solution, comprises a housing that is connectable to the liquid container and that has a first opening to the liquid container and a second opening to the surrounding environment of the liquid container. The venting apparatus further comprises an air-permeable and liquid-impermeable membrane, which is arranged between the first opening and the second opening in the housing. In addition, the venting apparatus comprises a slosh baffle, which at least partly covers the first opening and reduces or prevents an unimpeded sloshing of the liquid located in the liquid container against the membrane. The venting apparatus according to the invention is characterized in that the housing and the slosh baffle are formed in one piece.

The venting apparatus according to the invention has fewer individual parts and can additionally be produced by fewer production steps, and therefore the production effort and the production costs of the venting apparatus according to the invention are significantly reduced. A membrane within the meaning of the invention is a semi-permeable separation layer, which is permeable for gases and is impermeable for liquids. The membrane may optionally be deformed in the event of pressure changes in the liquid container, without being damaged during the process.

In accordance with a preferred variant, the housing, the membrane and the slosh baffle are formed in one piece. An accordingly formed venting apparatus has a number of individual parts that is again reduced, and therefore the production process is simplified and the production costs are reduced further.

In accordance with a further preferred variant, the housing and the slosh baffle are integrally bonded to one another. This has the advantage that the housing and the slosh baffle consist of the same material and can be produced in a common blow molding process or casting process.

In accordance with a further preferred variant, the venting apparatus comprises a membrane support, which is arranged between the first opening and the second opening and is formed in one piece with the housing and the slosh baffle. The membrane support stabilizes the membrane so that, in the event of a possible deformation of the membrane, said membrane is stabilized by the membrane support. The membrane can be molded or injected for example onto the membrane support. The membrane support may be arranged within the housing of the venting apparatus such that the membrane divides the volume of the housing into two separate volumes for liquids.

The slosh baffle preferably comprises at least two separate wing-like structures, which, in the installed position of the venting apparatus in the liquid container, extend away from the first opening and at least partly cover the first opening in the housing. An accordingly formed venting apparatus can be produced for example by a blow molding process or by an injection molding process, wherein the venting apparatus does not yet have its final form after a forced demolding process. By subsequent heating and/or subsequent deforming of the wing-like structures, the individual wing structures can be deformed in such a way that they cover a larger area of the first opening.

In accordance with a further preferred variant, the slosh baffle comprises at least two first web structures extending substantially parallel to one another and away from the first opening, wherein the first opening is arranged between the two first web structures. An accordingly formed venting apparatus can be produced particularly easily and therefore cost-effectively.

In accordance with another preferred embodiment of the present invention, the venting apparatus further comprises two second web structures extending away from the first opening and substantially parallel to one another and oriented substantially perpendicular to the first web structures, wherein the first opening is arranged between the first web structures and the second web structures. An accordingly formed venting apparatus can be produced cost-effectively since a forming process after the forced demolding process is no longer necessary. In addition, the first web structures and second web structures arranged at an angle to one another ensure an improved slosh baffle for the membrane so that an abrasive sloshing of a liquid/ice mixture against the membrane is effectively prevented. In addition, the angled arrangement of the first web structures relative to the second web structures means that any ice crystals settle better on the web structures so that further sloshing against the membrane is effectively prevented.

In accordance with a further preferred embodiment of the venting apparatus, the slosh baffle comprises a hollow cylinder extending away from the first opening and surrounding the first opening. The accordingly formed venting apparatus can be produced particularly easily and therefore cost-effectively.

An end of the hollow cylinder remote from the first opening may preferably be formed in a rosette-shaped manner. This results in an improved slosh baffle compared to an undeformed hollow cylinder.

Furthermore, in a further preferred variant of the venting apparatus, two mutually opposed regions of a peripheral wall of the hollow cylinder remote from the first opening are deformed toward one another. An accordingly formed slosh baffle provides improved protection against abrasive sloshing against the membrane and is also easily produced.

In accordance with a further preferred variant of the venting apparatus, the slosh baffle comprises a baffle area with a needle bore arranged therein. The baffle area is pivotably connected to the housing via a living hinge and is pivotable between an open position, in which the baffle area does not cover the first opening, and a closed position, in which the baffle area at least partly covers the first opening. Furthermore, the accordingly formed venting apparatus comprises a latching device, by means of which the baffle area can be latched on the housing in the closed position. An accordingly formed venting apparatus can be produced in a single production process, for example by blow molding or by injection molding. In addition, the connection of the baffle area to the housing via the living hinge ensures that the first opening of the housing is accessible for the replacement of the membrane, possibly together with a membrane support, in the open position of the baffle area. The accordingly formed venting apparatus thus has improved maintenance possibilities.

The invention also relates to a method for producing a venting apparatus for an aqueous urea solution, wherein the venting apparatus comprises a housing that is connectable to the liquid container and that has a first opening to the liquid container and a second opening to the surrounding environment of the liquid container, the venting apparatus further comprises an air-permeable and liquid-impermeable membrane, which is arranged between the first opening and the second opening in the housing, and the venting apparatus comprises an integrally molded slosh baffle, which at least partly covers the first opening in the venting apparatus, wherein the slosh baffle comprises at least two wing-like structures, which extend away from the first opening and at least partly cover the first opening in the housing. The method for producing the venting apparatus in particular comprises the injection molding of the housing from a thermoplastic, wherein the wing-like structures are molded on at an acute angle relative to a longitudinal axis of the housing and the housing is force-demolded from a mold after the casting process, wherein the temperature of a core of the mold is controlled so that the wing-like structures experience a targeted shrinkage distortion after forced demolding, in such a way that the wing-like structures form a hemispherical cover of the membrane.

The longitudinal axis is to be understood to mean the axis that forms the axis of symmetry through the opening in the housing.

The preferably approximately triangularly integrally molded wing-like structures are molded on with a relatively small angle of attack with respect to this longitudinal axis of the housing so that forced demolding from the mold is possible. Forced demolding means that the venting apparatus is removed from the mold with short-term deformation of the wing-like structures, which are still soft, without the use of movable parts (slide bars) in the mold.

The core necessary for production of the wing-like structures in the mold is heated in this method in such a way that a greater temperature is present on the sides of the wing-like structures facing one another than on the other side thereof. Once the venting apparatus has been demolded from the mold, cooling of different degrees is thus provided on the inner side of the wing-like structures and on the outer side of the wing-like structures. Due to this asymmetrical shrinkage distortion, a hemispherical formation of the wing-like structures is produced, without the need for use of additional means for deforming the wing-like structures.

Of course, such a deformation may alternatively be achieved by means of mechanical aids.

Figure 1B:
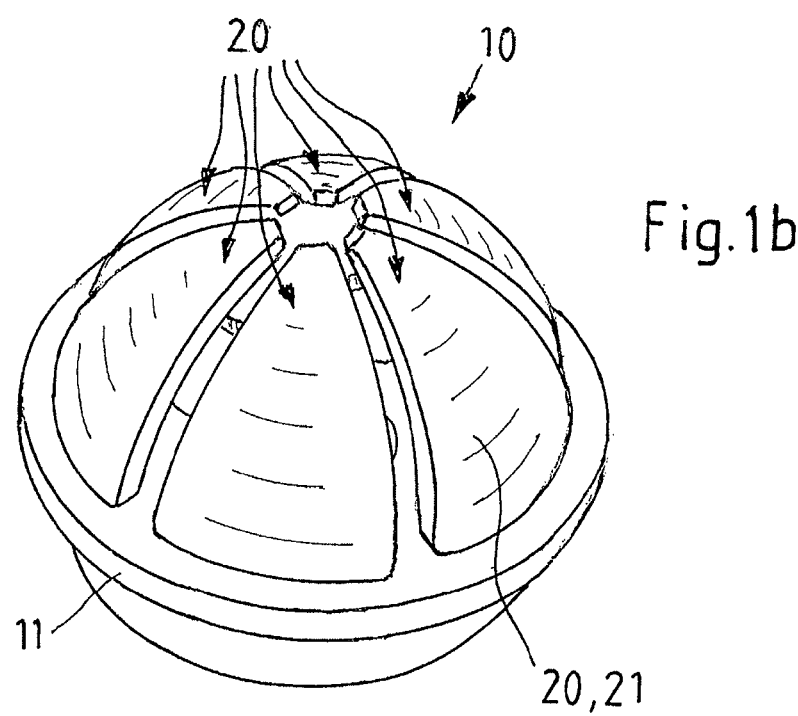
Figure 2:
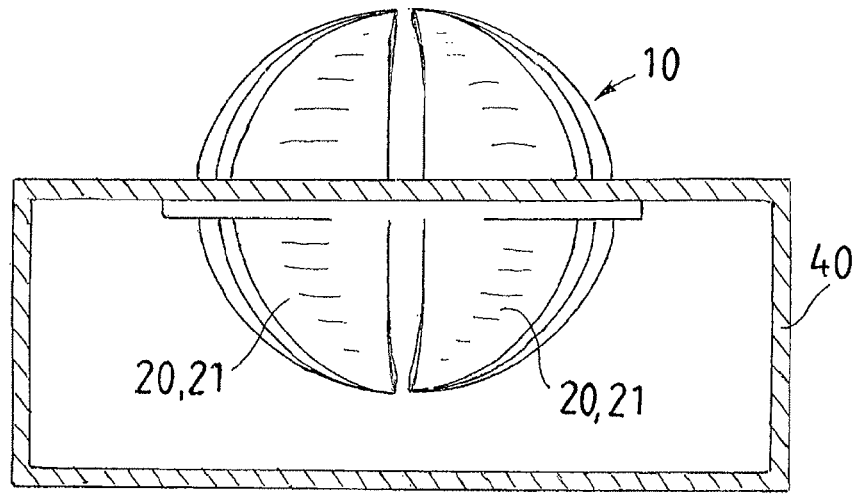
Figures 3A, 3B, 3C:
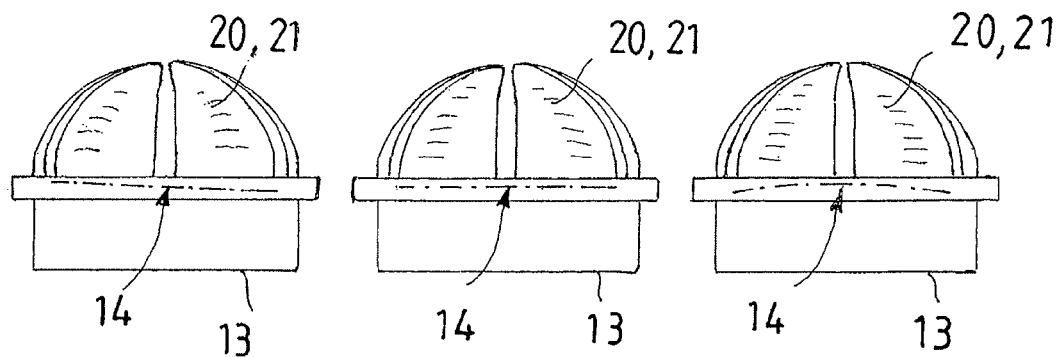
Figure 6:
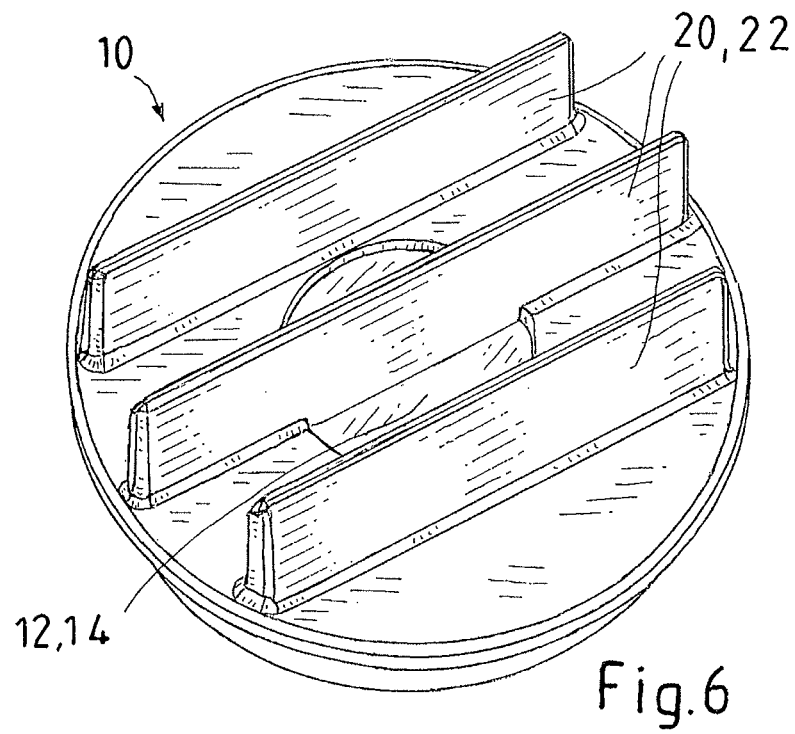
Figure 7:
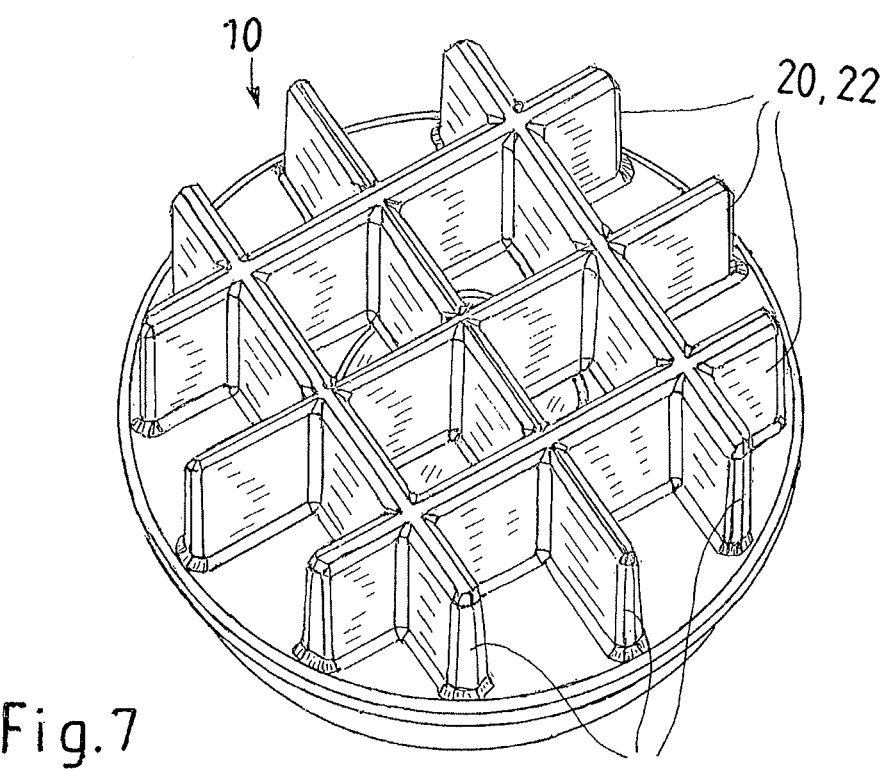
Figure 10A:
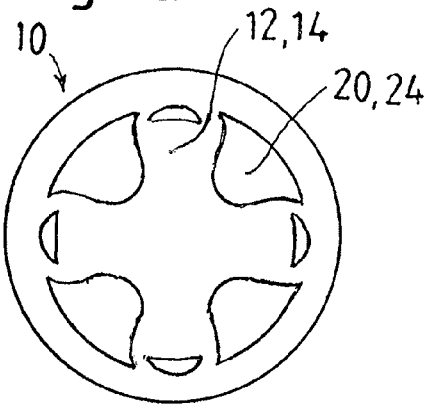
Figure 11A:
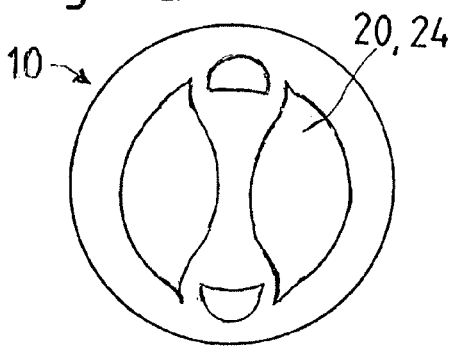
Figure 10B:
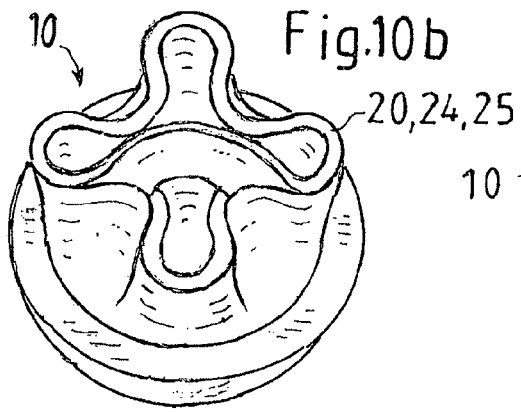
Figure 11B:
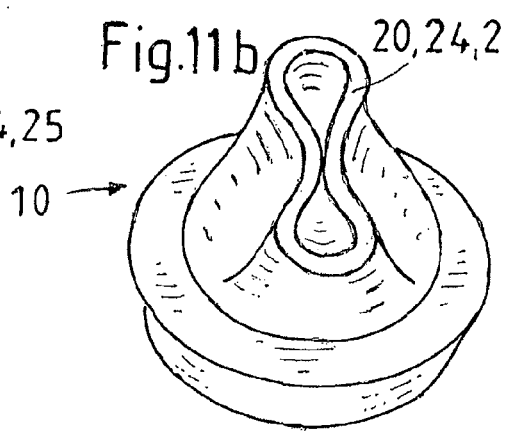
Figure 10C:
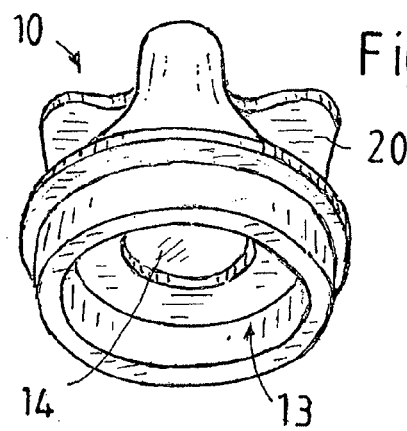
Figure 11C:
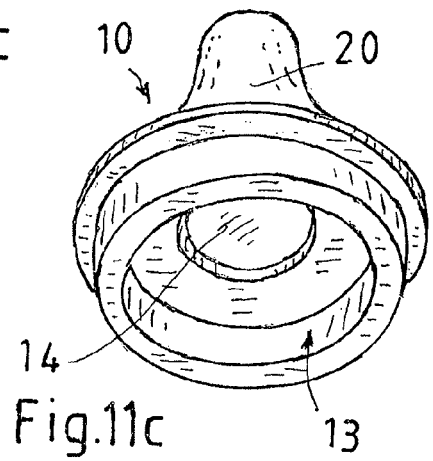
Figure 12A:
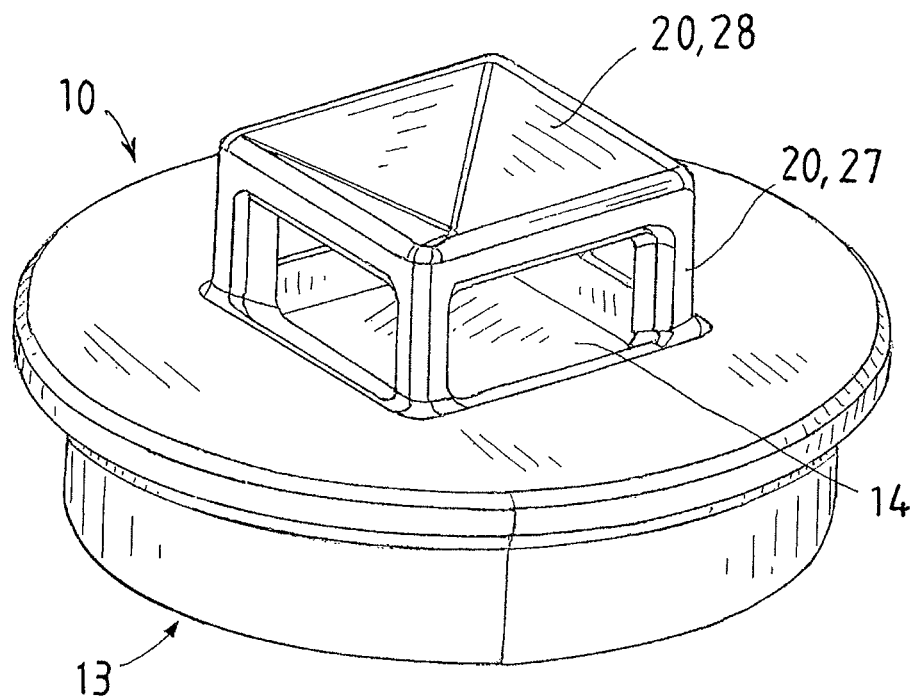
Figure 12B:
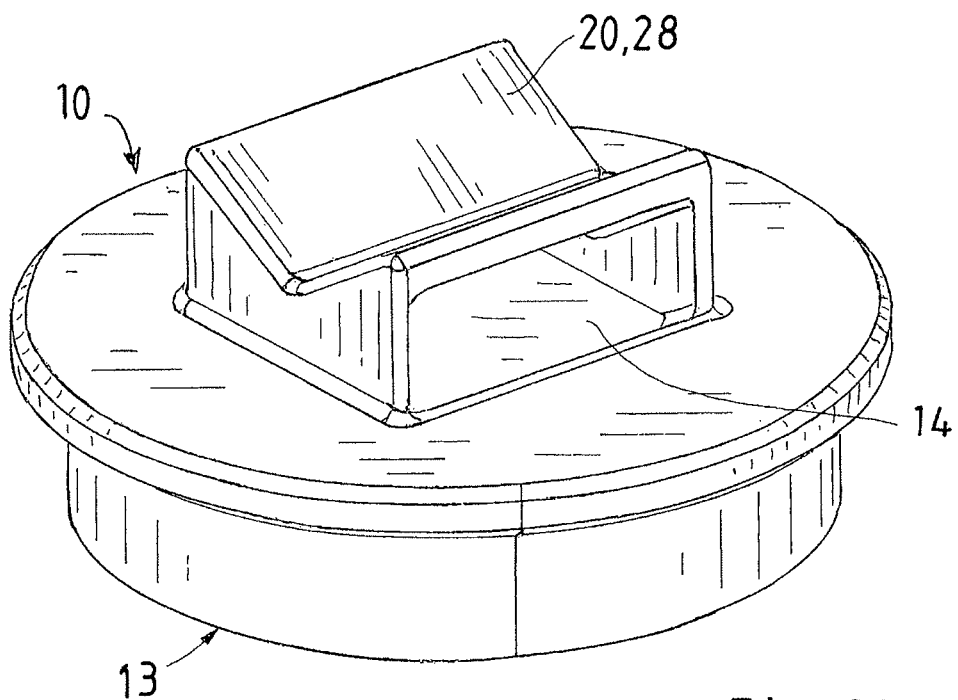
Figure 12C:
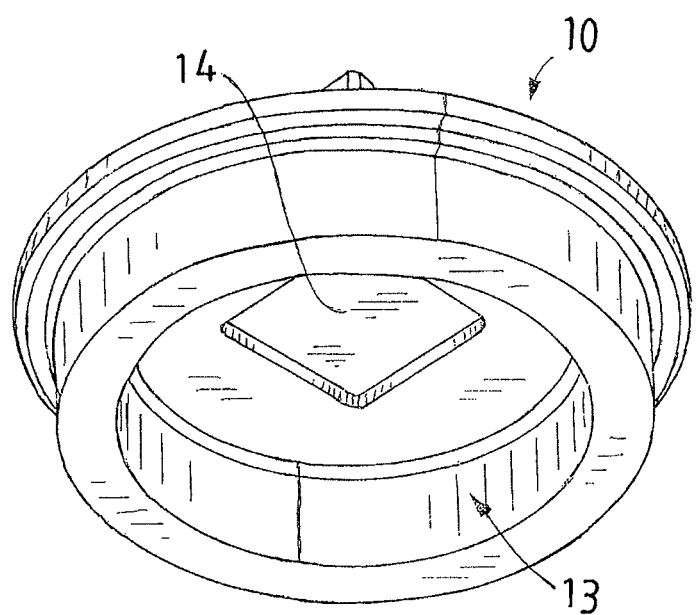

The invention will be explained in greater detail hereinafter on the basis of drawings, in which specifically:

FIG. 1a: shows a perspective illustration of a venting apparatus according to the invention after a deforming process;

FIG. 1b: shows the venting apparatus illustrated in FIG. 1a after a deforming process;

FIG. 2: shows a venting apparatus according to the invention in accordance with a further embodiment in conjunction with a liquid container;

FIG. 3a: shows a schematic side view of a venting apparatus according to the invention with an integrated and inclined membrane;

FIG. 3b: shows the venting apparatus illustrated in FIG. 3a, wherein the membrane has no inclined position;

FIG. 3c: shows a side illustration of the venting apparatus illustrated in FIGS. 3a and 3b, wherein the membrane is formed as a curved membrane;

FIGS. 4a and 4b: show a further embodiment of a venting apparatus according to the invention in two different perspective illustrations as viewed from the side facing the liquid container;

FIG. 4c: shows a perspective illustration of the venting apparatus illustrated in FIGS. 4a and 4b with a view of the second opening in the housing;

FIGS. 5a and 5b: show two perspective illustrations of a venting apparatus according to a further embodiment of the present invention;

FIG. 6: shows a perspective illustration of a further embodiment of the venting apparatus according to the invention as viewed from the side facing the liquid container;

FIG. 7: shows a perspective illustration of a further embodiment of the venting apparatus according to the invention as viewed from the side facing the liquid container;

FIGS. 8a-9b: show two different perspective illustrations of a further embodiment of the venting apparatus according to the invention;

FIGS. 10a-10c: show different perspective illustrations of a further embodiment of the venting apparatus according to the invention;

FIGS. 11a-11c: show different perspective illustrations of a further preferred embodiment of the venting apparatus according to the invention;

FIG. 12a: shows a perspective illustration of a further embodiment of the venting apparatus according to the invention as viewed from the side facing the liquid container;

FIG. 12b: shows a variant of the venting apparatus illustrated in FIG. 12a;

FIG. 12c: shows a perspective illustration of the venting apparatus illustrated in FIGS. 12a and 12b as viewed from the opposite side, that is to say from outside the liquid container;

FIG. 13a: shows a perspective illustration of a further embodiment of the venting apparatus according to the invention as viewed from the side facing the first opening in the housing; and FIGS. 13b, c: show a perspective illustration of a sectional view from the side of the venting apparatus illustrated in FIG. 13a.

In the following description, like reference signs denote like component parts or like features so that a description provided once with reference to one drawing with respect to a component part is also applicable to the other drawings or figures, thus avoiding a repetitive description.

FIG. 1a shows a perspective illustration of a first embodiment of the venting apparatus 10 according to the invention. The venting apparatus 10 is intended for liquid containers 40 (see FIG. 2), in particular for an aqueous urea solution. The venting apparatus 10 comprises a housing 11 that is connectable to the liquid container 40 and that has a first opening 12 to the liquid container 40 and a second opening 13 to the surrounding environment of the liquid container. The venting apparatus illustrated in FIGS. 1a and 1b comprises three first openings 12. Furthermore, the venting apparatus 10 comprises an air-permeable and liquid-impermeable membrane 14, which is arranged between the first openings 12 and the second opening 13 in the housing. The venting apparatus 10 illustrated in FIG. 1a further comprises a slosh baffle 20, which at least partly covers the first openings 12 and comprises a plurality of wing-like structures 21 extending away from the first openings 12. The wing-like structures 21 are triangular, wherein the wing-like structures 21 are connected via a broad side to the housing 11 and taper with increasing distance from the first openings 12. The venting apparatus 10 illustrated in FIG. 1a is illustrated in a state after a forced demolding process and before a deforming process.

In FIG. 1b, the venting apparatus 10 illustrated in FIG. 1a is illustrated after a deforming process, in which the wing-like structures 21 are deformed in such a way that they are deformed toward the center in a plan view of the venting apparatus 10. The respective wing-like structures 21 are then separated from one another by material recesses, wherein the material recesses are formed in a triangular manner before the deforming process so that the respective side faces of the wing-like structures 21 are arranged at an angle to one another, whereas the respective side faces of the wing-like structures 21 are oriented parallel to one another after the deforming process. The wing-like structures 21 are hemispherical after the deforming process.

FIG. 2 shows a venting apparatus 10 according to the invention in accordance with a further embodiment of the present invention in the installed position in a liquid container 40. The venting apparatus 10 illustrated in FIG. 2 has a wing structure on either side, that is to say a wing structure facing the inner side of the liquid container 40 and a wing structure facing the surrounding environment of the liquid container 40, that is to say a wing structure facing away from the liquid container 40. The wing structure facing the liquid container 40 and protruding into said liquid container is used as a slosh baffle 20, and the wing structure protruding out from the liquid container 40 is used as a cover and as a drainage aid for splashed water.

Three further embodiments of a venting apparatus 10 according to the invention are illustrated in FIGS. 3a to 3c. In FIG. 3a, the membrane 14 arranged between the first opening 12 and the second opening 13 in the housing 11 is inclined so that a liquid located on the outer side of the membrane 14 can run off in an improved manner. The venting apparatus 10 illustrated in FIG. 3b differs from the venting apparatus 10 illustrated in FIG. 3a in that the membrane 14 is straight. The membrane 14 can curve outwardly, for example with a pressure increase within the liquid container 40, so that a liquid located on the outer side of the membrane 14 is drained away toward the outer edges of the membrane 14. This convexity of the membrane 14 is illustrated in FIG. 3c. It is also possible however for the membrane 14 to likewise have the curved shape illustrated in FIG. 3c without a pressure difference between the inner side of the liquid container 40 and the surrounding environment thereof, such that a liquid located on the outer side of the membrane 14 can be removed in an assisted manner.

FIGS. 4a to 4c show a further variant of a venting apparatus 10 according to the invention. In FIGS. 4a and 4b, the venting apparatus is illustrated perspectively from the side of the first opening 12, whereas the venting apparatus 10 in FIG. 4c is illustrated perspectively from the side of the second opening 13. With the venting apparatus 10 illustrated in FIGS. 4a to 4c, the slosh baffle 20 comprises two first web structures 22 extending substantially parallel to one another and away from the first opening 12. The first opening 12, through which the membrane 14 is visible, is arranged between the two first web structures 22.

FIGS. 5a and 5b show a further preferred embodiment of the venting apparatus 10 according to the invention, wherein FIG. 5a perspectively illustrates the venting apparatus 10 from the side of the first opening 12, whereas FIG. 5b perspectively illustrates the venting apparatus illustrated in FIG. 5a from the side of the second opening 13. The venting apparatus 10 illustrated in FIGS. 5a and 5b differs from the venting apparatus 10 illustrated in FIGS. 4a to 4c in that the slosh baffle 20 further comprises two second web structures 23 extending away from the first opening 12, oriented substantially parallel to one another, and oriented substantially perpendicular to the first web structures 22. The first opening 12 is arranged between the first web structures 22 and the second web structures 23. The venting apparatus 10 illustrated in FIGS. 5a and 5b provides an improved slosh baffle compared to the venting apparatus 10 illustrated in FIGS. 4a to 4c.

A variant of the venting apparatus 10 illustrated in FIGS. 4a to 4c is illustrated in FIG. 6. The venting apparatus 10 illustrated in FIG. 6 comprises three first web structures 22 extending substantially parallel to one another and away from the first opening 12, wherein the middle web structure 22 extends over the first opening 12 in the housing 11 and thus provides an improved slosh baffle.

The variant of the venting apparatus 10 illustrated in FIG. 7 differs from the venting apparatus 10 illustrated in FIGS. 5a and 5b in that it comprises three first web structures 22 and three second web structures 23, wherein the middle first web structures 22 and middle second web structures 23 extend over the opening 12 in the housing 11. An improved slosh baffle for the membrane 14 is thus provided.

Two further embodiments of the venting apparatus 10 according to the invention are illustrated in FIGS. 8a to 9b and are characterized in that the slosh baffle 20 comprises a hollow cylinder 24 extending away from the first opening 12 and surrounding the first opening 12. Here, the hollow cylinder 24 illustrated in FIGS. 8a, 8b is designed in such a way that the inner wall of the hollow cylinder 24, at the base, adjoins the border of the first opening 12 in the housing 11 in a flush manner. By contrast, the hollow cylinder 24 illustrated in FIGS. 9a and 9b is larger, and therefore the inner wall of the hollow cylinder 24 does not terminate with the periphery of the first opening 12 in the housing 11.

A variation of the venting apparatus 10 illustrated in FIGS. 9a to 9b is illustrated in FIGS. 10a to 10c. Here, an end 25 of the hollow cylinder 24 remote from the first opening 12 is rosette-shaped. This rosette-shaped deformation of the end 25 of the hollow cylinder remote from the first opening 12 can be achieved after a forced demolding process by means of a deforming process.

A further variant of the hollow cylinder illustrated in FIGS. 9a and 9b is illustrated in FIGS. 11a to 11c, in which two mutually opposed regions of a peripheral wall 26 of the hollow cylinder 24 remote from the first opening 12 are deformed toward one another. The venting apparatuses 10 illustrated in FIGS. 10a to 10c and in FIGS. 11a to 11c have an improved slosh baffle compared to the venting apparatus 10 illustrated in FIGS. 9a and 9b.

A further preferred variant of a venting apparatus 10 according to the invention is illustrated in FIG. 12a, the slosh baffle 20 of said variant comprising four webs 27 or supports 27, which extend away from the first opening and are each connected to a material area 28 covering the first opening 12. The material area 28 is deformed here in such a way that it forms four sub-areas, which are oriented in a pyramidal manner relative to one another, wherein the distance between the pyramid tip and the first opening 12 is smaller than the distance between the pyramid base and the first opening 12, such that the pyramid tip extends in the direction of the first opening 12.

FIG. 12b shows a further variant of the venting apparatus 10 according to the invention, in which a material area 28 is held by two web structures 27 or holding areas 27, wherein the material area 28 covers the first opening 12 in the housing 10. The material area 28 comprises two sub-areas, which are oriented at an angle to one another and of which the contact line is arranged at a smaller distance from the first opening 12 compared to the distance of the boundary lines of the sub-areas from the first opening 12, said boundary lines being arranged opposite the contact line.

In FIG. 12c, the venting apparatus 10 illustrated in FIGS. 12a and 12b is viewed from the side facing the second opening 13.

A further preferred variant of the venting apparatus 10 according to the invention is illustrated in FIGS. 13a to 13c. Here, the slosh baffle 20 comprises a baffle area 29 with a needle bore 30 arranged therein. The baffle area 29 is pivotably connected to the housing 11 via a living hinge 31, in such a way that the baffle area 29 is pivotable between an open position, in which the baffle area 29 does not cover the first opening 12, and a closed position, in which the baffle area 29 covers the first opening. In all of FIGS. 13a to 13c, the venting apparatus 10 is illustrated in the closed position of the baffle area 29. The venting apparatus 10 further comprises a latching device 32, by means of which the baffle area can be latched on the housing 11 in the closed position.

The housing 11 and the baffle area 29 are interconnected via the living hinge 31, and therefore the housing 11 and the slosh baffle 20 are formed in one piece. The housing 11 and the slosh baffle 20 can be produced for example in a common blow molding process or in a common injection molding process, in which the material layer connecting the slosh baffle 20 to the housing 11 and acting as a living hinge 31 is also formed at the same time.

The housing 11 and the slosh baffle 12 are formed in one piece in all venting apparatuses 10 illustrated in FIG. 1 to FIG. 13c.

LIST OF REFERENCE SIGNS 10 venting apparatus
11 housing (of the venting apparatus)
12 first opening (in the housing)
13 second opening (in the housing)
14 membrane
20 slosh baffle
21 wing-like structure (of the slosh baffle)
22 first web structure (of the slosh baffle)
23 second web structure (of the slosh baffle)
24 hollow cylinder (of the slosh baffle)
25 end of the hollow cylinder (remote from the first opening)
26 peripheral wall (of the hollow cylinder)
27 web (of the slosh baffle)
28 material area (of the slosh baffle)
29 baffle area (of the slosh baffle)
30 needle bore (in the baffle area)
31 living hinge (of the venting apparatus)
32 latching device (of the venting apparatus)
40 liquid container

What is claimed is:
1. A venting apparatus for a liquid container, wherein the venting apparatus comprises:

a housing that is connectable to the liquid container and that has a first opening to the liquid container and a second opening to the surrounding environment of the liquid container;

an air-permeable and liquid-impermeable membrane arranged between the first opening and the second opening in the housing;

a slosh baffle, which at least partly covers the first opening;

wherein the housing and the slosh baffle are formed in one piece;

wherein the slosh baffle comprises at least two cantilevered structures, said structures extending away from the first opening and partly cover the first opening in the housing; and wherein the cantilevered structures form a hemispherical cover to the membrane.

2. The venting apparatus as claimed in claim 1, wherein the housing, the membrane and the slosh baffle are formed in one piece.

3. The venting apparatus as claimed in claim 1, wherein the housing and the slosh baffle are integrally bonded to one another.

4. The venting apparatus as claimed in claim 1, wherein the venting apparatus has a membrane support, which is arranged between the first opening and the second opening and is formed in one piece with the housing and the slosh baffle.

5. The venting apparatus as claimed in claim 1, wherein the slosh baffle comprises four webs, which extend away from the first opening and are connected to a material area covering the first opening.

6. A liquid container, comprising:
a venting apparatus wherein the venting apparatus includes
a housing that is connectable to the liquid container and that has a first opening to the liquid container and a second opening to the surrounding environment of the liquid container;
an air-permeable and liquid-impermeable membrane arranged between the first opening and the second opening in the housing;
a slosh baffle, which at least partly covers the first opening;
wherein the housing and the slosh baffle are formed in one piece;
wherein the slosh baffle comprises at least two cantilevered structures, said structures extending away from the first opening and partly cover the first opening in the housing; and
wherein the cantilevered structures form a hemispherical cover to the membrane.

7. The liquid container as claimed in claim 6, wherein the liquid container and the venting apparatus are formed in one piece.

8. A method for producing a venting apparatus for an aqueous urea solution, wherein the venting apparatus comprises a housing that is connectable to a liquid container and that has a first opening to the liquid container and a second opening to the surrounding environment of the liquid container, the venting apparatus further comprises an air-permeable and liquid-impermeable membrane, which is arranged between the first opening and the second opening in the housing, and the venting apparatus comprises an integrally molded slosh baffle, which at least partly covers the first opening in the venting apparatus and has at least two cantilevered structures, which extend away from the first opening and at least partly cover the first opening in the housing, wherein the method comprises the injection molding of the housing of a thermoplastic, the cantilevered structures are molded on at an acute angle relative to a longitudinal axis of the housing and the housing is force-demolded from a mold after the injection molding process, wherein the temperature of a core of the mold is controlled so that the cantilevered structures experience a targeted shrinkage distortion after forced demolding, in such a way that the cantilevered structures form a hemispherical cover of the membrane.

* * * * *